May 16, 1961 K. TRÜMPER 2,984,479
BUFFER
Filed June 13, 1955 7 Sheets-Sheet 1

INVENTOR:
Konrad Trümper
BY:
Michael S. Struker
agt.

May 16, 1961 K. TRÜMPER 2,984,479
BUFFER
Filed June 13, 1955 7 Sheets-Sheet 2

May 16, 1961 K. TRÜMPER 2,984,479
BUFFER
Filed June 13, 1955 7 Sheets-Sheet 3

INVENTOR:
Konrad Trümper
BY:
Michael S. Striker
agt.

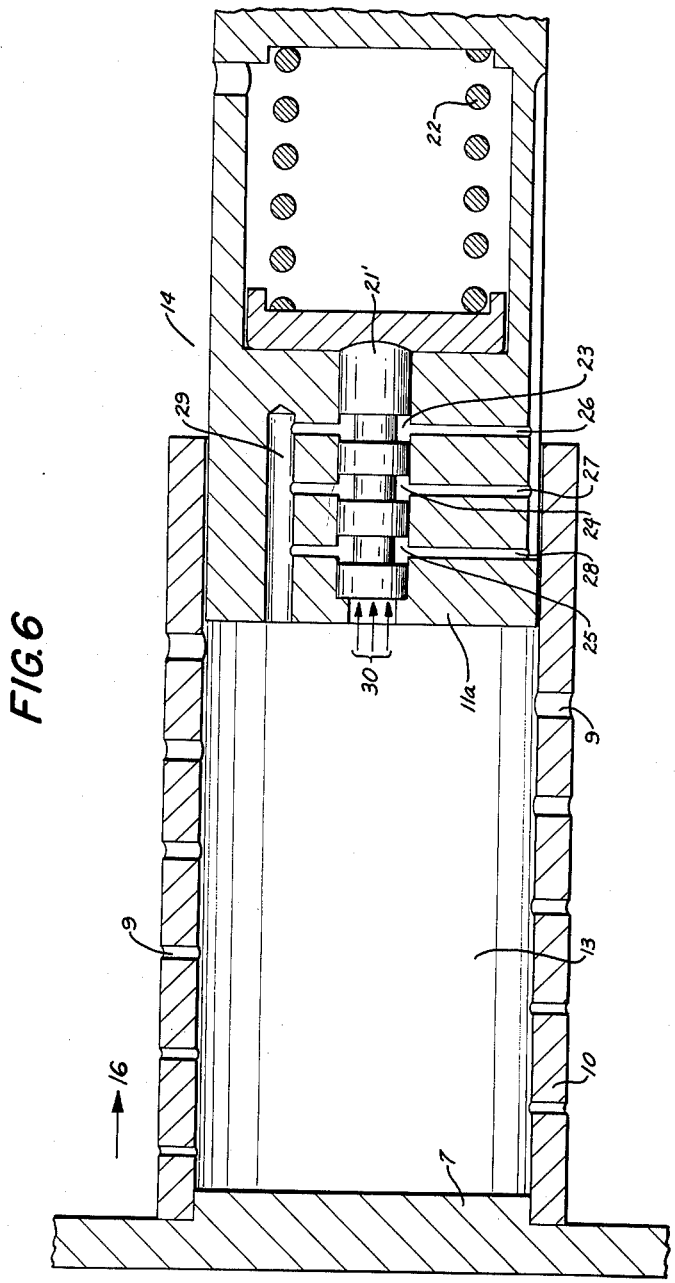

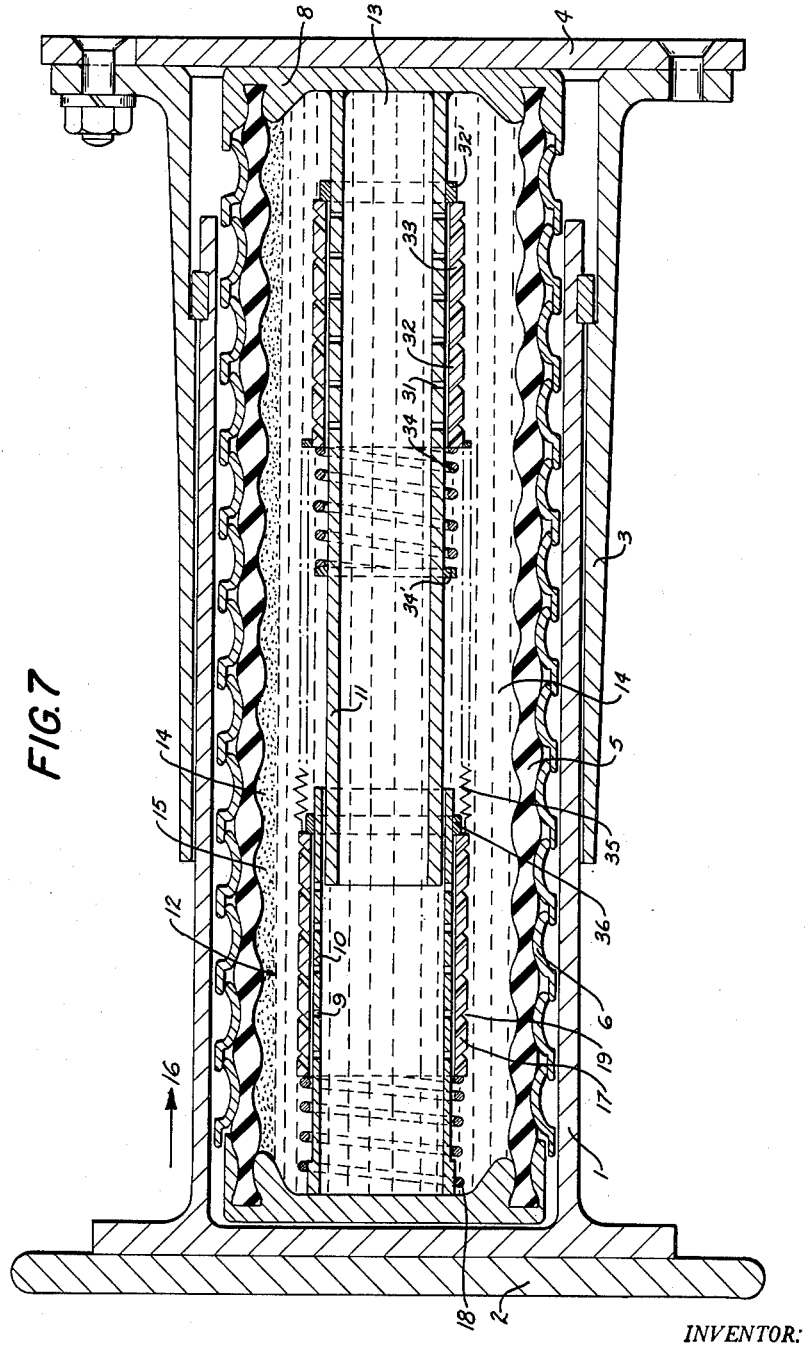

May 16, 1961 K. TRÜMPER 2,984,479
BUFFER
Filed June 13, 1955 7 Sheets-Sheet 6

INVENTOR.
Konrad Trümper
BY:
Michael S. Strike
agt.

May 16, 1961 K. TRÜMPER 2,984,479
BUFFER
Filed June 13, 1955 7 Sheets-Sheet 7

INVENTOR:
Konrad Trümper
BY:
Michael S. Striker
agt.

United States Patent Office 2,984,479
Patented May 16, 1961

2,984,479
BUFFER

Konrad Trümper, Grotzingen, near Karlsruhe, Germany, assignor to Rheinstahl Siegener Eisenbahnbedarf Aktiengesellschaft Filed June 13, 1955, Ser. No. 515,086

11 Claims. (Cl. 267—64)

The present invention relates to buffers.

More particularly, the present invention relates to buffers or shock absorbers for use with railway vehicles or the like.

There exist buffer arrangements wherein the rate of flow of a damping liquid or the like is controlled so as to vary the efficacy of the buffer. In known structures the arrangement of the parts is usually such that the damping liquid may flow from one chamber, through a suitable throttling arrangement, and into another chamber into which the damping fluid may flow freely. It has been found, however, that the shock-absorbing action of a buffer may be vastly increased by providing an arrangement wherein the pressure of the medium above the damping liquid level is increased so as to retard the flow of the damping liquid.

It is therefore an object of the present invention to provide a buffer arrangement in which the damping fluid, after having passed through a suitable throttling arrangement, flows into a chamber in which the air pressure above the damping liquid is constantly increased during operation of the buffer.

It is another object of the present invention to provide a buffer arrangement which is sturdy, which is capable of withstanding great forces, and which will give long periods of trouble-free service.

It is yet another object of the present invention to provide a buffer arrangement which incorporates a minimum number of parts and may therefore be constructed very economically.

With the above objects in view, the present invention mainly consists in a buffer arrangement which comprises first and second buffer members forming at least two chambers between themselves and mounted for movement relative to each other in such a manner that the volume of each of the chambers is reduced during movement of the buffer members relative to each other in a predetermined direction. Combined conduit and throttling means are provided for placing the chambers in communication with each other and for controlling the flow of liquid between the chambers, and a damping liquid is arranged in at least one of the chambers. Also, means are provided for retarding the rise of the level of a liquid in the other of the chambers during relative movement of the buffer members in the predetermined direction, which means may be constituted by air located in the other chamber and subjected to compression during relative movement of the buffer members in the predetermined direction. As a result, the damping liquid will flow from the one chamber through the combined conduit and throttling means and into the other chamber during movement of the buffer members relative to each other in the predetermined direction, and the flow of the damping liquid into the other chamber will thus be retarded during such movement of the buffer members. Consequently, movement of these members relative to each other in the predetermined direction will be retarded when the same are subjected to a force tending to move them relative to each other in this direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4 is a fragmentary sectional view of a detail of the embodiment illustrated in Fig. 2;

Figure 5 is a fragmentary sectional view of a modified embodiment of a detail of the structure illustrated in Fig. 2;

Figure 6 is a sectional elevational view of yet another preferred embodiment of the present invention;

Figure 7 is a sectional elevational view of still another preferred embodiment of the present invention;

Figure 1:
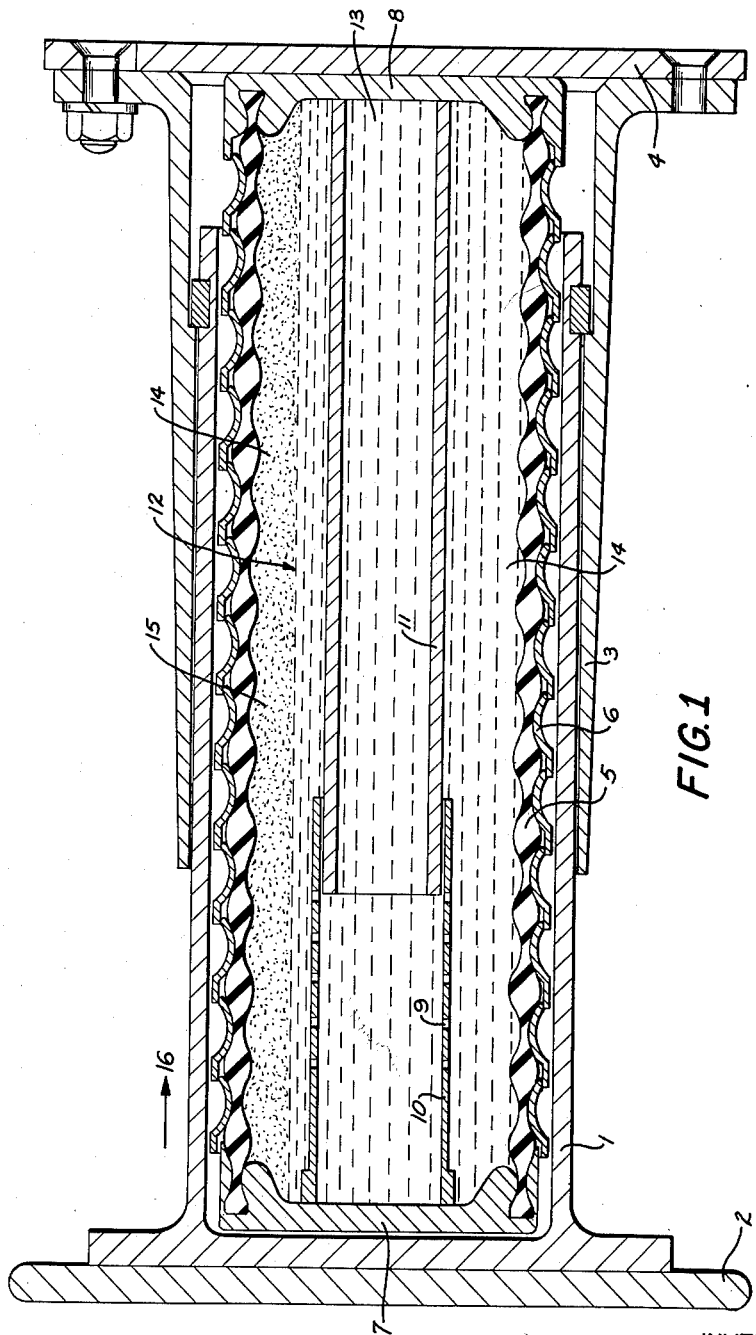
Figure 1 is a sectional elevational view of a preferred embodiment of the present invention.

Referring now to the drawings, and to Figure 1 thereof in particular, there is shown a buffer or shock-absorber structure for use in a railway car or the like. The structure comprises a stationary base plate 4 formed with an outer tubular portion 3 in which an outer tubular portion 1 of a buffer plate 2 is telescopically and slidably arranged. An axially compressible tubular resilient sleeve member 5, which may be made of rubber, is arranged in the region of the inner surfaces of the outer tubular portions 1 and 3, and suitable reinforcing rings 6 may be provided for preventing radial expansion of the sleeve member. Sleeve member 5 and reinforcing rings 6 constitute axially compressible but radially substantially non-expansible tubular sleeve means. As is clearly shown in the drawing, the free ends of the sleeve member 5 may be embedded in face plates 7 and 8.

An inner tubular portion 10 is mounted on the face plate 7 and is preferably concentric with the outer tubular portion 1. The tubular portion 10 is provided with openings 9 for the purpose to be described below. The tubular plunger portion 11 is mounted on the face plate 8 and is in telescopic and sliding engagement with the inner tubular portion 10, so that the two buffer members constituted by the above-described parts form between themselves an inner chamber 13 which is bounded by the inner tubular portions 10 and 11 and an outer annular chamber 14 which is bounded on the inside by the inner tubular portions 10 and 11 and on the outside by the sleeve member 5. The chambers are filled with a damping fluid which forms a liquid level indicated at 12, above which is located a suitable gaseous medium, such as air, under either atmospheric or superatmospheric pressure.

When the buffer plate 2 is moved toward the base plate 4 in the direction of the arrow 16, damping fluid in the inner chamber 13 is pressed outwardly through the openings 9. As mentioned above, the air located above the liquid level 12 is under atmospheric or superatmospheric pressure, and this pressure is increased not only as a result of the increased quantity of damping liquid in the chamber 14, but also as a result of the decrease of the volume of the chamber 14. Consequently, the liquid level of the damping liquid in the chamber 14 will rise with increasing difficulty, and the liquid will flow through the openings 9 with increasing pressure.

Moreover, the total cross-sectional area of the openings 9 through which the damping fluid may flow will be decreased as the buffer plate 2 moves rightwardly, as viewed in Figure 1, inasmuch as an increasing number of individual openings 9 will be covered by the inner tubular portion 11. It will be seen therefore, that in the embodiment illustrated in Figure 1 the rate at which the damping liquid may flow between the chambers will be dependent upon the distance which the buffer plate 2 has moved in the direction of the arrow 16.

Figure 2:
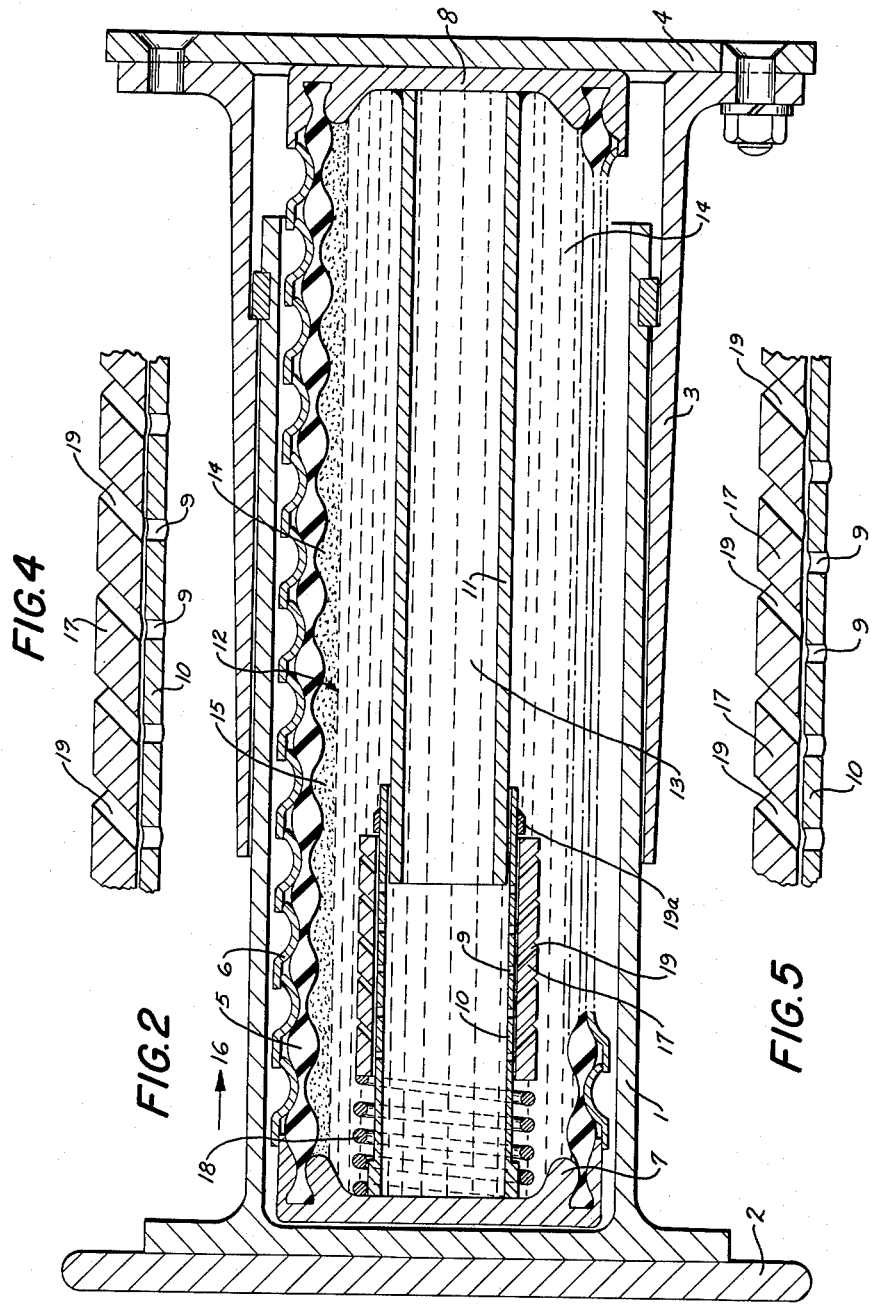
Figure 2 is a sectional elevational view of another preferred embodiment of the present invention.

If desired, additional means may be provided for controlling the total area of the individual openings 9, which additional means may control this area in accordance with the magnitude of the force to which the buffer is subjected, and such arrangement is illustrated in Figures 2 to 5. In Figure 2 the control means are shown as including a sleeve 17 which is slidably arranged on the inner tubular member 10 and is biased rightwardly by a spring 18 against an abutment member 19a. The sleeve 17 is formed with a plurality of radial passages 19 which preferably form an angle with the axis of the sleeve. The passages 19 correspond to the openings 9 in the inner tubular portion 10, and in the embodiment illustrated in Figures 2 and 3, the openings 9 are slightly ahead of the inner ends of the passages 19 when the sleeve 17 is in its rest position. If desired, the sleeve 17 may be provided with annular flanges 20, and the inner tubular portion 11 may be replaced by a piston member 11a.

Figure 3:
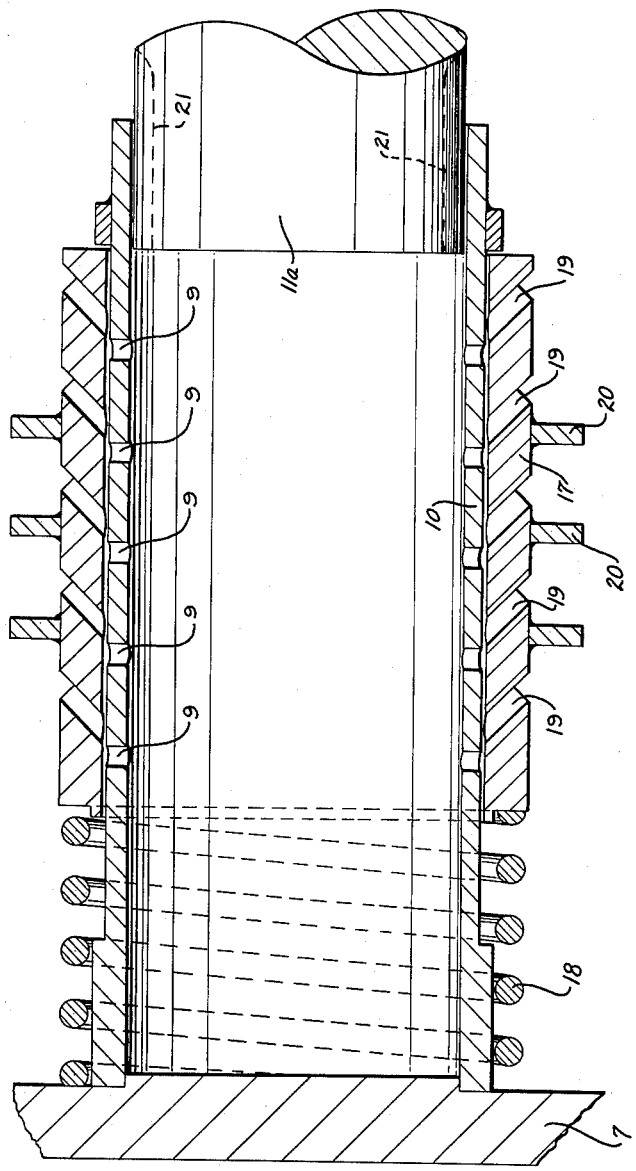
Figure 3 is a sectional elevational view of a modified embodiment of a detail of the structure shown in Figure 2.

In the rest position of the parts as shown in Figures 2 and 3, the inner and outer chambers 13 and 14 are in communication with each other by means of the passages 19, the thin annular space between the inner surface of the sleeve 17 and the outer surface of the inner tubular portion 10, and the openings 9, as well as by the thin annular space formed between the inner surface of the inner tubular portion 10 and the outer surface of the inner tubular portion 11. In Figure 3, the last-mentioned passage is formed between the inner surface of the inner tubular portion 10 and the outer surface of the plunger or piston member 11a, which may be formed with longitudinal passages 21, shown in dotted lines, for increasing this last-mentioned passage.

In Figure 4, the arrangement of the parts is such that when the sleeve 17 is in its rest position the openings 9 and the passages 19 are in alignment with each other, and in Figure 5 the arrangement of the parts is such that the axial distance between individual passages 19 is greater than the axial distance between individual openings 19.

The operation of the above-described embodiment, particularly as shown in Figure 3, is as follows:

Initial movement of the buffer plate 2 in the direction of the arrow 16 will cause rightward movement, as viewed in the drawing, of the inner tubular portion 10 relative to the piston member 11a. The pressure, however, can not increase beyond a predetermined amount inasmuch as the initial cross-sectional area through which the liquid may flow is constant. Inasmuch as the sleeve 17 may move relative to the tubular portion 10, the sleeve will not, due to its inertia, move rightwardly as fast as the tubular portion 10, i.e., the sleeve 17 will tend to remain stationary in space thereby compressing the spring 18, so that the passage 19 will come into alignment with the openings 9 and the total cross-sectional area of the passages formed between the inner chamber 13 and the outer chamber 14 will be increased. This increase will be proportional to the force with which the buffer plate 2 is moved rightwardly, so that the damping action of the buffer will be a function of the force applied to the buffer plate 2. After a lapse of time, the spring 18 will expand and move the sleeve 17 rightwardly relative to the tubular portion 10.

After the force has ceased to be applied to the buffer plate 2, the parts will be restored to the position illustrated in the drawing as a result of the expansion of the air located above the liquid level 12.

In the embodiment illustrated in Figure 6, a piston valve member 21' is arranged in the plunger or piston member 11a. The piston valve member is subjected to the pressure of the damping liquid located in the chamber 13, which pressure acts in the direction of the arrows 30 during movement of the face plate 7 in the direction of the arrow 16. The piston valve member 21' is urged leftwardly, as viewed in Figure 6, by a spring 22.

The piston valve member 21' is provided with annular grooves 23, 24, 25 which, when in registration with the passages 26, 27, 28, respectively, permit the flow of liquid therethrough. All of these passages are in communication with passage 29, as is clearly shown in Figure 6.

When the face plate 7 is moved rightwardly with relatively little force the piston valve member 21' will remain substantially in the position illustrated in Figure 6, thereby permitting the free passage of liquid through the passages 26—29. However, when the face plate 7 is moved rightwardly with relatively large force, the piston valve members 21' will be moved rightwardly against the action of the spring 22 so as at least partially to close the passages 26—28, thereby reducing the total cross-sectional area of the passages placing the chamber 13 in communication with the chamber 14. In this way, the damping action of the embodiment illustrated in Figure 6 is a function of the force with which the face plate 7 is moved rightwardly.

In Figure 6, the openings 9 are arranged along a helical path, so that the piston member 11a may cover successive openings 9 uniformly during rightward movement of the face plate 7.

According to the embodiment illustrated in Figure 7, the inner tubular portion 11 is provided with openings 31 which correspond to the openings 9 in the inner tubular portion 10. A second sleeve 32, which corresponds to the sleeve 17, is slidably arranged over the inner tubular portion 11 and is provided with passages 33. The sleeve 32 is biased against an abutment 32' by a spring 34 which abuts against an abutment 34'. If desired, the sleeves 17 and 32 may be interconnected by means of a spring 35, in which case the abutment 32' may be omitted. In either event the mode of operation of the sleeve 32 is analogous to the operation of the sleeve 17 in that after a force has been applied to the buffer and a railroad vehicle which carries the base plate 4 and with it the tubular portion 11 has begun to move rightwardly under the influence of this force, the sleeve 32 will, due to its inertia, tend to remain stationary and therefore move relative to the tubular portion 11, thereby compressing the spring 34.

Figure 8:
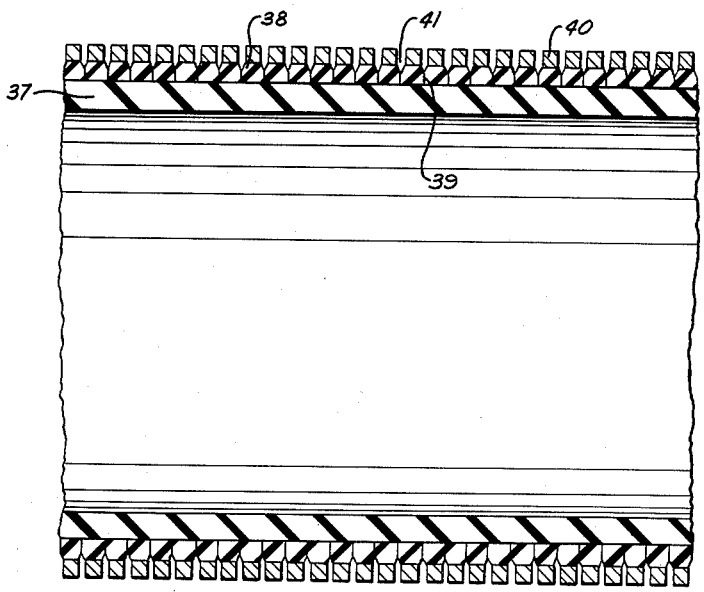
Figure 8 is a fragmentary sectional view of a detail of the present invention.

Figure 8 is a fragmentary sectional view of a sleeve member of the type which may be used as the structure 5, 6 show in the above-described embodiments. The sleeve member is composed of an elastic rubber-like tube 37 surrounded by adjacent rings 38 which are made of a rubber-like material which is somewhat firmer than the material of which the tube 37 is made. The rings 38 have cross-sectional configurations substantially as illustrated in Figure 8, so that the rings, in the region 39 of their inner peripheral surfaces, are touching or are arranged so that they are spaced very closely to each other. The outer peripheral surfaces of the rings 38 are joined to the inner peripheral surfaces of metal rings 40, the arrangement of the parts being such that spaces 41 are provided between adjacent rings 40. As a result, the entire structure, which is shown in its unstressed condition in Figure 8, is axially compressible.

Figure 9:
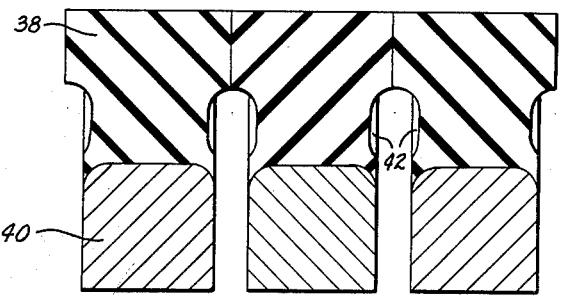
Figures 9 to 11 are fragmentary sectional views of modified embodiments of a detail of the structure shown in Figure 8.
Figure 10:
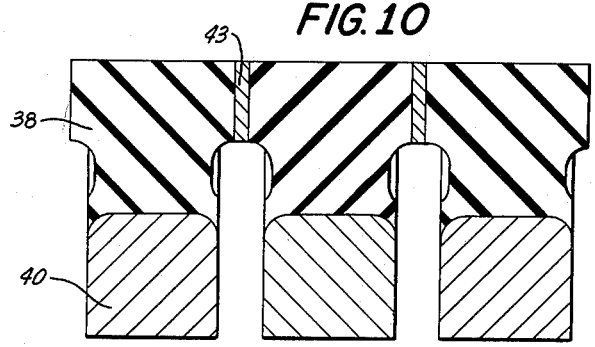
Figure 11:
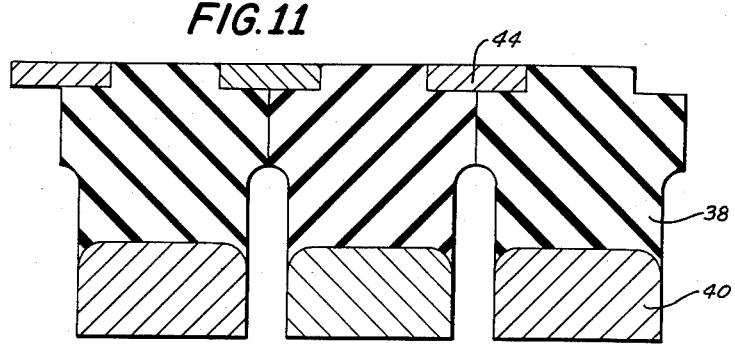

In Figures 9 to 11, the cross-sectional configurations of the rings 38 and 40 are substantially as shown therein, and in Figure 9 the rings 38 are formed with annular grooves 42. In Figure 10 adjacent rings 38 are spaced from each other by flat annular spacer rings 43, and in Figure 11 annular rings 44 are provided for covering the joint of adjacent rings 38 in the region of the inner peripheral surfaces thereof.

It will be understood that each of the elements described above, or two or more together, may also find a useful application in other types of shock absorbers differing from the types described above.

While I have illustrated and described the invention as embodied in buffer for railway vehicles or the like, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A buffer arrangement, comprising, in combination, first and second buffer members co-axially arranged opposite each other for movement toward and away from each other; a pair of cylindrical members arranged in telescoping relationship between said buffer members and being respectively connected thereto for movement therewith in axial direction toward and away from each other, said pair of cylindrical members forming an inner chamber, the volume of which is reduced when said buffer members move towards each other and enlarged when the same move away from each other; axially compressible but radially substantially non-expansible tubular sleeve means surrounding said cylindrical members spaced therefrom and having fluid-tightly closed ends engaging said first and second buffer members, respectively, said sleeve means forming a fluid-tightly closed outer annular chamber between said buffer members and surrounding said inner chamber, the volume of said outer annular chamber being reduced when said buffer members move towards each other and enlarged when the same move away from each other; and combined conduit and throttling means formed in at least one of said cylindrical members and extending axially therealong for placing said inner and outer chambers in communication with each other during axial movement of said cylindrical members one with respect to the other, whereby when said inner chamber is filled with a dampening liquid and sufficient dampening liquid is located in said outer annular chamber to cover said combined conduit and throttling means, liquid will flow through said combined conduit and throttling means from said inner to said outer annular chamber during the movement of said buffer members toward each other, so that a compressible gas located above the liquid level in said outer chamber will be compressed due to the reduction of said volume of said outer annular chamber during such movement and due to the flow of liquid from said inner to said outer chamber, which in turn will retard flow of liquid from said inner to said outer chamber and movement of said buffer members toward each other; and control means operatively associated with said combined condut and throttling means for automatically controlling the rate at which the latter permits the flow of liquid between said inner and outer chambers in accordance with the force tending to move said buffer members inwardly.

2. A buffer arrangement comprising, in combination, first and second buffer members each having an outer substantially horizontal tubular portion and arranged in telescoping relationship so that said buffer members are horizontally axially movable relative to each other, each of said buffer members also having a substantially horizontal concentric inner tubular portion, said inner tubular portions also being arranged in telescoping relationship so that said buffer members form between themselves an inner chamber and an outer annular chamber; and combined conduit and throttling means in at least one of said inner tubular portions for placing said chambers in communication with each other and for controlling the flow of liquid between said chambers, said combined conduit and throttling means including a plurality of inner passages extending in substantially radial direction through said one inner tubular portion, said inner passages being spaced in the axial direction of said inner tubular portions so that said inner passages are sequentially covered by the other of said inner tubular portions during inward telescoping movement thereof, said combined conduit and throttling means further including a tubular slide member encompassing and in sliding relation with said one inner tubular portion in the region of said inner passages therethrough, said slide member being formed with a plurality of outer passages therethrough adapted to cooperate with said inner passages through said one inner tubular portion in such a manner that said inner and outer passages are in different degrees of alignment with each other in different axial positions of said slide member, said slide member being biased toward a rest position wherein said inner and outer passages are in a first degree of alignment with each other and being free to move out of its rest position against the force biasing it thereinto into another position wherein said inner and outer passages are in another degree of alignment with each other during inward movement of said buffer members relative to each other at a predetermined rate whereby when sufficient damping liquid is located between said outer tubular portions so that the liquid level thereof is above said inner chamber, the liquid will flow from said inner chamber through a progressively smaller number of said inner passages and the corresponding outer passages in said other degree of alignment therewith and into said outer chamber during inward movement of said buffer members relative to each other at said predetermined rate, thereby progressively changing the total cross-sectional area of said combined conduit and throttling means and consequently changing the resistance thereof to the flow of the liquid, and whereby air located in said outer chamber above the liquid level of the damping liquid will be compressed and therefore retard the rise of liquid level in said outer chamber during such inward movement of said buffer members, thereby retarding such inward movement of said buffer members when the same are subjected to a force tending to move them inwardly at said predetermined rate.

3. A buffer arrangement as defined in claim 2 wherein said other passages extend at an angle to the axis of said slide member.

4. A buffer arrangement as defined in claim 2, and outer annular flange means on said slide member, adapted to be at least partially immersed in liquid in said outer annular chamber for damping axial movement of said slide member.

5. An axially compressible tube comprising, in combination, a flexible and axially compressible tubular member; a series of flexible and axially compressible inner annular members surrounding said tubular member, each of said inner annular members having an inner peripheral surface in face-to-face relationship with the outer surface of said tubular member and an outer peripheral portion having an axial length smaller than that of said inner peripheral portion, said inner annular members being arranged adjacent each other so as to be substantially in contact with adjacent inner annular members in the region of said inner peripheral surfaces and so as to be spaced from adjacent inner annular members in the region of said outer peripheral portions; and a plurality of substantially non-expansible outer annular retaining members encompassing said outer peripheral portions of said inner annular members, respectively, said outer annular members having an axial length not greater than the axial length of said outer peripheral portions of said inner annular members, whereby the tube may be freely compressed axially while retaining a substantially constant outside diameter.

6. An axially compressible tube as defined in claim 5 wherein said inner annular members are made of a firmer material than said tubular member.

7. An axially compressible tube as defined in claim 5, and a plurality of annular spacer members between adjacent inner annular members in said region of said inner peripheral surfaces thereof and in contact with said outer surface of said tubular member.

8. A buffer arrangement comprising, in combination, first and second buffer members having first and second outer tubular parts, respectively, said tubular parts being in telescoping relationship, said first buffer member having an inner tubular portion extending in the direction of said first outer tubular part and said second buffer member having a plunger portion extending in the direction of said second outer tubular part, said portions also being in telescoping relationship so that said buffer members form between themselves an inner chamber and an outer annular chamber; an axially compressible but radially substantially non-compressible tubular sleeve arranged in said outer chamber and forming the outer wall thereof, said sleeve having fluid-tightly closed ends engaging said first and second buffer members, respectively; and combined conduit and throttling means in at least one of said portions for placing said chambers in communication with each other and for controlling the rate of flow of a liquid between said chambers, said combined conduit and throttling means being so constructed and arranged that the rate of flow of liquid from said inner chamber to said outer chamber is dependent upon the extent of inward telescoping movement of said buffer members when the same are exposed to a force which compresses them, said combined conduit and throttling means including a plurality of passages through said inner tubular portion, said passages being spaced in axial direction of said inner tubular portion so that they are sequentially covered by said plunger portion during inward telescoping movement of said buffer members, whereby a damping liquid in said inner chamber will, during inward telescoping movement of said buffer members when the same are exposed to a force which compresses the same, pass from said inner chamber to said outer chamber at a rate dependent upon the extent of inward telescoping movement of said buffer members and air located in said outer chamber above the level of the damping liquid in said outer chamber will be compressed, thereby retarding the rise of liquid level in said outer chamber during such inward movement of said buffer members so that such inward movement is retarded, said combined conduit and throttling means further include a tubular slide member encompassing and in sliding relation with said inner tubular portion of the region of said passages therethrough, said slide member being formed with a plurality of passages therethrough which passages are adapted to cooperate with said passages through said inner tubular portion in such a manner that said passages are in different degrees of alignment with each other in different axial positions of said slide member.

9. A buffer arrangement as defined in claim 8 wherein said combined conduit and throttling means further include biasing means for biasing said slide member into a rest position wherein said passages thereof are in a predetermined degree of alignment with said passages through said inner tubular portion.

10. A buffer arrangement as defined in claim 9 wherein said axial spacing between said passages of said sleeve member is equal to the axial spacing between corresponding passages through said inner tubular portion.

11. A buffer arrangement, comprising, in combination, first and second buffer members co-axially arranged opposite each other for movement toward and away from each other; a pair of cylindrical members arranged in telescoping relationship between said buffer members and being respectively connected thereto for movement therewith in axial direction toward and away from each other, said pair of cylindrical members forming an inner chamber, the volume of which is reduced when said buffer members move towards each other and enlarged when the same move away from each other; an axially compressible tubular sleeve surrounding said cylindrical members spaced therefrom and having fluid-tightly closed ends engaging said first and second buffer members, respectively, said sleeve means forming a fluid-tightly closed outer annular chamber between said buffer members and surrounding said inner chamber; reinforcing means surrounding said sleeve and engaging the outer surface thereof for preventing any substantial radial expansion thereof during inward movement of said buffer members while permitting axial compression of said sleeve so that the volume of said outer annular chamber is reduced when said buffer members move towards each other and enlarged when the same move away from each other; and combined conduit and throttling means formed in at least one of said cylindrical members for placing said inner and outer chambers in communication with each other and for controlling the flow of a liquid between said chambers, said combined conduit and throttling means including a plurality of passages through one of said cylindrical members and communicating with said inner chamber, said passages being spaced in axial direction of said one cylindrical member so that they are sequentially covered by the other cylindrical member during movement of said buffer members towards each other, said combined conduit and throttling means further include a tubular slide member surrounding and slidingly engaging said one cylindrical member in the region of said passages therethrough, said slide member being formed with a plurality of passages therethrough which are adapted to cooperate with said passages through said one cylindrical member in such a manner that said passages are in different degrees of alignment with each other in different axial positions of said slide member whereby when said inner chamber is filled with a dampening liquid and sufficient dampening liquid is located in said outer annular chamber to cover said combined conduit and throttling means, liquid will flow at a rate dependent upon the extent of movement of said buffer members toward each other through said combined conduit and throttling means from said inner to said outer chamber during the movement of said buffer members toward each other, so that a compressible gas located above the liquid level in said outer annular chamber will be compressed due to the reduction of said volume of said outer annular chamber during such movement and due to the flow of liquid from said inner to said outer chamber, which in turn will retard flow of liquid from said inner to said outer chamber and movement of said buffer members toward each other.

References Cited in the file of this patent

UNITED STATES PATENTS

| 970,225 | Holden | Sept. 13, 1910 |
| 1,622,892 | Wadsworth | Mar. 29, 1927 |
| 2,392,387 | Joy | Jan. 8, 1946 |
| 2,436,573 | Heynes | Feb. 24, 1948 |
| 2,506,725 | Magrum | May 9, 1950 |
| 2,511,237 | Bateman et al. | June 13, 1950 |
| 2,571,279 | Myklestad | Oct. 16, 1951 |
| 2,614,833 | Laugaudin | Oct. 21, 1952 |
| 2,620,182 | Marston | Dec. 2, 1952 |
| 2,640,693 | Magrum | June 2, 1953 |

FOREIGN PATENTS

| 168,654 | Germany | June 17, 1905 |
| 529,870 | Great Britain | Nov. 29, 1940 |